United States Patent
Arlitt et al.

(10) Patent No.: US 10,880,319 B2
(45) Date of Patent: Dec. 29, 2020

(54) DETERMINING POTENTIALLY MALWARE GENERATED DOMAIN NAMES

(71) Applicant: ENTIT SOFTWARE LLC, Sanford, NC (US)

(72) Inventors: Martin Arlitt, Calgery (CA); Pratyusa K. Manadhata, Piscataway, NJ (US)

(73) Assignee: MICRO FOCUS LLC, Santa Clara, CA (US)

(*) Notice: Subject to any disclaimer, the term of this patent is extended or adjusted under 35 U.S.C. 154(b) by 269 days.

(21) Appl. No.: 15/963,336

(22) Filed: Apr. 26, 2018

(65) Prior Publication Data
US 2019/0334931 A1   Oct. 31, 2019

(51) Int. Cl.
*H04L 29/06* (2006.01)
*H04L 29/12* (2006.01)

(52) U.S. Cl.
CPC ...... *H04L 63/1416* (2013.01); *H04L 61/1511* (2013.01); *H04L 63/145* (2013.01)

(58) Field of Classification Search
CPC .......................... H04L 63/1416; H04L 63/145
See application file for complete search history.

(56) References Cited

U.S. PATENT DOCUMENTS

| | | | | |
|---|---|---|---|---|
| 7,600,011 B1* | 10/2009 | Urbanek | ........... | H04L 29/12066 709/203 |
| 8,347,394 B1* | 1/2013 | Lee | ..................... | H04L 63/1425 726/25 |
| 8,516,585 B2 | 8/2013 | Cao et al. | | |
| 8,631,498 B1* | 1/2014 | Hart | ..................... | H04L 63/145 726/25 |
| 9,245,121 B1 | 1/2016 | Luo et al. | | |
| 9,325,662 B2* | 4/2016 | Luna | ................... | H04L 61/1511 |
| 9,325,735 B1* | 4/2016 | Xie | ......................... | H04L 63/20 |
| 9,473,528 B2* | 10/2016 | Zuk | ..................... | H04L 63/1408 |
| 9,479,524 B1 | 10/2016 | Hagen | | |
| 9,516,039 B1 | 12/2016 | Yen et al. | | |
| 9,602,525 B2 | 3/2017 | Qian et al. | | |
| 9,602,538 B1* | 3/2017 | Chou | ..................... | H04L 63/20 |

(Continued)

FOREIGN PATENT DOCUMENTS

| CN | 105024969 A | 11/2015 |
|---|---|---|
| CN | 106911717 A | 6/2017 |

(Continued)

OTHER PUBLICATIONS

Ahluwalia et al., Detecting Broad Length Algorithmically Generated Domains, Oct. 11, 2017, https://link.springer.com/chapter/10.1007/978-3-319-69155-8_2 (16 pages).

(Continued)

*Primary Examiner* — Ali Shayanfar (57) ABSTRACT

In some examples, a Domain Name System (DNS) server is to receive, over a network, a DNS query containing a domain name, the DNS query sent by a device. The DNS server is to determine whether the domain name is potentially generated by malware. In response to determining that the domain name is potentially generated by malware, the DNS server is to generate a DNS response containing information indicating that the domain name is potentially generated by malware, and send the DNS response to the network.

16 Claims, 4 Drawing Sheets

(56) References Cited

U.S. PATENT DOCUMENTS

| | | | |
|---|---|---|---|
| 9,686,291 | B2 | 6/2017 | Antonakakis et al. |
| 9,756,063 | B1 | 9/2017 | Chung |
| 9,781,139 | B2 | 10/2017 | Sofka et al. |
| 9,805,193 | B1* | 10/2017 | Salsamendi ............ G06F 21/566 |
| 2007/0033645 | A1* | 2/2007 | Jones ...................... H04L 61/00 726/12 |
| 2007/0078936 | A1* | 4/2007 | Quinlan .................. H04L 51/12 709/206 |
| 2009/0083413 | A1* | 3/2009 | Levow ................ H04L 63/1416 709/224 |
| 2009/0144826 | A2* | 6/2009 | Piccard ................. G06F 21/552 726/24 |
| 2012/0198549 | A1* | 8/2012 | Antonakakis ....... H04L 61/1511 726/22 |
| 2015/0019708 | A1* | 1/2015 | Denis .................... H04L 61/103 709/224 |
| 2016/0337391 | A1 | 11/2016 | McKinney |
| 2016/0352679 | A1 | 12/2016 | Josiah et al. |
| 2016/0352772 | A1* | 12/2016 | O'Connor .......... H04L 63/1483 |
| 2017/0295196 | A1* | 10/2017 | Arnell ................. H04L 63/1425 |

FOREIGN PATENT DOCUMENTS

| | | |
|---|---|---|
| WO | WO-2017030569 A1 | 2/2017 |
| WO | WO-2017139489 A1 | 8/2017 |

OTHER PUBLICATIONS

Antonakakis et al., Damballa Inc., Detecting Malware Domains at the Upper DNS Hierarchy, Aug. 12, 2011 (16 pages).

Antonakakis et al., From Throw-Away Traffic to Bots: Detecting the Rise of DGA-Based Malware, 2012 (16 pages).

Ashraf Abu-Alia, Detecting Domain Flux Botnet using Machine Learning Techniques, Feb. 2015 http://qspace.qu.edu.qa/bitstream/handle/10576/3279/Abu-Alia%2C%20Ashraf.pdf?sequence=4&isAllowed=y (104 pages).

Bortzmeyer, Internet Engineering Task Force (IETF), Request for Comments: 8020, Updates: 1034, 2308, Category: Standards Track, NXDOMAIN: There Really is Nothing Underneath, Nov. 2016 (10 pages).

Darling et al., A Lexical Approach for Classifying Malicious URLs, 2015, http://ieeexplore.ieee.org/abstract/document/7237040/ (8 pages).

Fu et al., Abstract Only, Stealthy Domain Generation Algorithms, Feb. 13, 2017 http://ieeexplore.ieee.org/document/7852496/ (5 pages).

HP ArcSight DNS Malware Analytics, Datasheet, Aug. 2015 (2 pages).

Infoblox, Authoritative Domain Name Server dated on or before Apr. 28, 2017 (4 pages).

Lee et al., Domain Name Service (DNS) dated on or before Feb. 20, 2018 (26 pages).

Manadhata et al., U.S. Appl. No. 15/884,978 entitled Indicating Malware Generated Domain Names Using N-Grams filed Jan. 31, 2018 (30 pages).

Manadhata et al., U.S. Appl. No. 15/884,983 entitled Indicating Malware Generated Domain Names Using Digits filed Jan. 31, 2018 (30 pages).

Manadhata et al., U.S. Appl. No. 15/884,988 entitled Malware-Infected Device Identifications filed Jan. 31, 2018 (38 pages).

Martin Boasson Nordby, Security Incident Detection with Passive DNS Logs, May 2, 2014 https://www.duo.uio.no/bitstream/handle/10852/42055/Nordby-Master.pdf?sequence=29 (84 pages).

Mockapetris, Network Working Group, Request for Comments: 1035, Obsoletes: RFCs 882, 883, 973, Domain Names—Implementation and Specification, Nov. 1987 (55 pages).

Mowbray et al., Finding Domain-Generation Algorithms by Looking at Length Distributions, 2014, https://pdfs.semanticscholar.org/bc12/34d57c2bfae6bcc6a8f1f1743ba42b8317ed.pdf (6 pages).

Osint Feeds From Bambenek Consulting, Master Feeds downloaded Jan. 3, 2018, http://osint.bambenekconsulting.com/feeds/ (3 pages).

Plohmann et al., A Comprehensive Measurement Study of Domain Generating Malware, Proceedings of the 25th USENIX Security Symposium, Aug. 2016 (17 pages).

Schiavoni et al., Phoenix: DGA-based Botnet Tracking and Intelligence, 2014 (20 pages).

Wang et al., Breaking Bad: Detecting Malicious Domains Using Word Segmentation, Jun. 2015 https://arxiv.org/pdf/1506.04111.pdf (7 pages).

Wikipedia, Botnet last edited Dec. 22, 2017 (8 pages).

Wikipedia, Edit distance last edited Dec. 29, 2017 (5 pages).

Wikipedia, Levenshtein distance last edited Jan. 6, 2018 (8 pages).

Woodbridge et al., Predicting Domain Generation Algorithms with Long Short-Term Memory Networks, Nov. 2, 2016, http://www.covert.io/research-papers/deep-learning-security/Predicting%20Domain%20Generation%20Algorithms%20with%20Long%20Short-Term%20Memory%20Networks.pdf (13 pages).

Yadav et al., Detecting Algorithmically Generated Malicious Domain Names, Nov. 1-3, 2010, http://citeseer.ist.psu.edu/viewdoc/download?doi=10.1.1.221.1167&rep=rep1&type=pdf (14 pages).

* cited by examiner

DETERMINING POTENTIALLY MALWARE GENERATED DOMAIN NAMES

BACKGROUND

A piece of malware can infect a system, where the malware can perform various malicious activities. In some cases, once the malware infects a system, the malware can establish communication with a remote server that can be referred to as a Command and Control (C2) server. The C2 server can then send instructions to the malware to perform respective malicious activities.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A Domain Name System (DNS) is a component of a network that translates human-friendly domain names into computer-useable network addresses, such as Internet Protocol (IP) addresses (and vice versa). For example, when a user types "abc.com" into a web browser on an electronic device, the electronic device does not know where the web server that hosts "abc.com" is located. The electronic device can send a DNS query to a DNS server (or multiple DNS servers) to obtain the web server's network address, such as an Internet Protocol (IP) address, and possibly other information.

DNS can be exploited by malware code to attack a network (such as a denial-of-service attack), to steal stored information, to transmit spam or ransomware, or to perform other malicious activities. Once a malware code infects an electronic device, the malware code may first attempt to establish communication with a Command and Control (C2) server that is outside of a network to which the infected electronic device is attached. Once communication is established with the C2 server, the infected electronic device (or multiple infected electronic devices) can receive instructions to perform malicious activities from a botmaster that operates the C2 server. The botmaster can be a human, a program, or a machine. A group of infected electronic devices that are remotely controlled by the same botmaster via a C2 server can be referred to as a "botnet."

In some cases, a malware code can contact a C2 server by using an IP address from a hard-coded list of IP addresses and/or domains. However, once an instance of the malware code is detected and analyzed by anti-malware tools, the IP addresses used by the malware code can be blacklisted or sinkholed, which kills the botnet by blocking communications between C2 servers and bots (instances of the malware code).

In other cases, malware code can use Domain Generation Algorithms (DGAs) to establish communications with C2 servers. A DGA can use a starting value, called a "seed," to pseudo-randomly generate a list of domain names. When an electronic device is infected by a DGA-based malware code, the DGA-based malware code can use the seed (e.g., a current date or other value) to generate a list of domain names, which can include tens to tens-of-thousands (or more) domain names. The C2 server can generate the same list of domain names, but a botmaster or attacker picks only one domain name (or a subset of the domain names) to register. The DGA-based malware code can go through the list of domain names and send DNS queries for each domain name, one-by-one, until one of the domain names resolves to an IP address. If a given domain name being used by a botnet gets blacklisted or taken down, the botmaster can simply move to another domain name on the list.

In order to avoid collisions with other malware families, a malware family can use a DGA that is different from the DGAs used by the other malware families. A "malware family" refers to a family that includes a particular botmaster, C2 server(s), and DGA-based malware code that can interact with the C2 server(s) of the family. Some DGAs select letters and numbers with equal probabilities, producing domain names like "bqwqeiswupyny.org." Other DGAs simply use hash outputs, producing domain names like "5d19cbf688d4.com."

In some examples, a dedicated analysis system can be used for determining whether or not a domain name is potentially issued by malware. Such a domain name can be referred to as a "malicious domain name" or a "DGA domain name." A domain name not issued by malware can be referred to as a "benign domain name." The dedicated analysis system can be implemented with a hardware appliance or multiple hardware appliances (e.g., computers, processors, etc.) along with corresponding machine-readable instructions executable on the hardware appliance(s).

Within an enterprise (e.g., a company, an educational organization, a government agency, a home, etc.), electronic devices can issue a large number of DNS queries to perform lookups for retrieving network addresses corresponding to respective domain names. The domain names included in DNS queries can be logged, and the dedicated analysis system can retrieve the logged domain names to perform a DGA analysis for determining whether or not the domain names are DGA domain names or benign domain names.

However, implementing a dedicated analysis system can be expensive, and some network administrators may be unwilling to add further infrastructure to a network due to the increased costs. Another challenge is that scalable data collection usually employs a hardware appliance. It can be a challenge to find a suitable place to put the hardware appliance in a network. Also, network administrators may not like to manage yet another hardware appliance in the network environment.

Moreover, a dedicated analysis system employs dedicated data storage to log the domain names for performing analysis. For example, DNS data may have to be transmitted from a data collector (or multiple data collectors) to a target storage location accessible by the dedicated analysis system. The sending of such DNS data to the data storage may consume network bandwidth.

Additionally, after analysis performed by the dedicated analysis system identifies DGA domain names, further actions may have to be performed, sometimes by human security analysts, with other devices or services in the network, such as a DNS server. For example, a security analyst may make changes to the DNS server so that queries containing the identified DGA domain names are blocked by the DNS server. This adds a further processing layer that increases the complexity of taking remediation actions in response to detecting DGA domain names.

In accordance with some implementations of the present disclosure, instead of using a dedicated analysis system to determine whether a domain name is a DGA domain name or a benign domain name, a DNS server instead can be used to perform such a determination.

Figure 1:
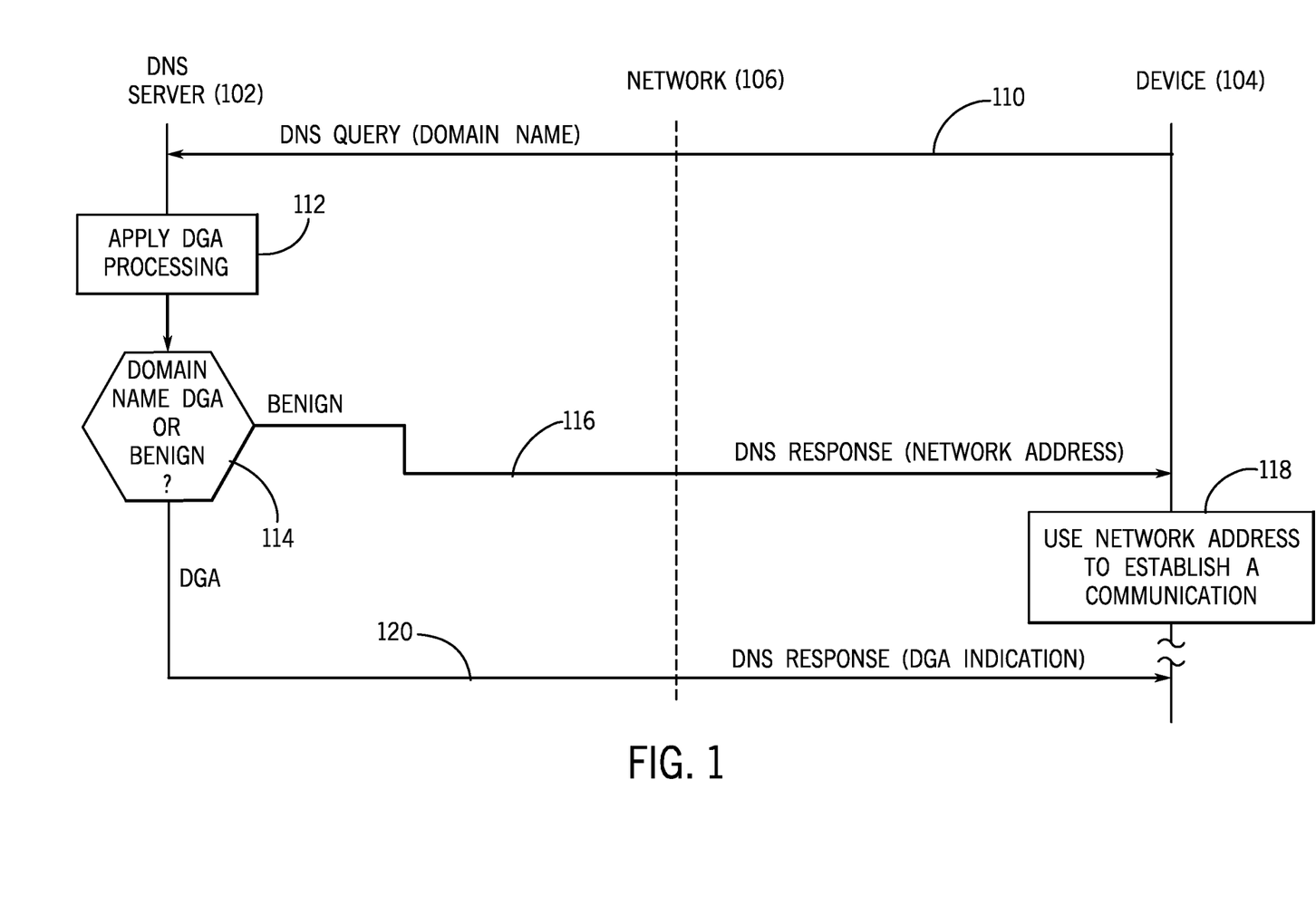
FIG. 1 is a message flow diagram of a process according to some examples.

FIG. 1 is a message flow diagram that shows a process according to some implementations of the present disclosure. The process shown in FIG. 1 involves a DNS server 102, a device 104, and a network 106. The device 104 can include any type of electronic device that is able to send a DNS query. For example, the device 104 can include any of the following: a notebook computer, a desktop computer, a tablet computer, a smartphone, a server computer, a communication node, a wearable device (e.g., a smart watch, smart eyeglasses, a head-mounted device, etc.), a game appliance, an Internet of Things (IoT) device (e.g., a network-connected sensor, a network-connected camera, a network-connected thermostat, etc.), a vehicle, a server computer, a storage server, a communication node (e.g., a switch, a router, etc.), and so forth.

The network 106 can include a wired network and/or a wireless network. A wireless network can include a wireless local area network (WLAN), a cellular network, and so forth. The network 106 can include a public network (e.g., the Internet), a private network (e.g., a local area network), or a combination of both.

The device 104 sends (at 110), over the network 106 to the DNS server 102, a DNS query that contains a domain name. In response to receiving the DNS query, the DNS server 102 applies (at 112) DGA processing to determine (at 114) whether the domain name in the DNS query is a DGA domain name or a benign domain name.

If the domain name is determined to be a benign domain name, the DNS server 102 sends (at 116) a DNS response to the device 104, where the DNS response includes a network address (e.g., an IP address) mapped to the domain name. The DNS server 102 can access mapping information (either stored at the DNS server 102 or in a storage medium accessible by the DNS server 102) that maps domain names to respective network addresses, such as IP addresses. Although reference is made to the DNS response 116 including one network address, in some cases, the DNS response 116 can include multiple network addresses mapped to the domain name. In addition to the network address, the DNS response can also include other information.

Upon receiving the network address(es) in the DNS response, the device 104 can use (at 118) the network address(es) to establish a communication with a destination (or multiple destinations) at the network address(es) in the DNS response.

On the other hand, if the DNS server 102 determines (at 114) that the domain name in the DNS query is a DGA domain name, the DNS 102 sends (at 120) a different DNS response, which includes a DGA indication. In some examples, the DNS response 120 can be referred to as an NXDOMAIN DNS response that indicates that the domain name does not exist (when in fact the domain name may exist but the DNS sever 102 wants to prevent an infected device from successfully communicating with a C2 server).

The DGA indication in the DNS response 120 includes information specifying that the domain name is potentially generated by malware (i.e., the domain name is a DGA domain name). The DNS response 120 containing the DGA indication does not include any network address mapped to the domain name. As such, the device 104 would not be able to establish any communication with a destination (e.g., a C2 server) corresponding to the network address for the domain name.

The information specifying that the domain name is potentially generated by malware can be included in a field within a header of the DNS response 120. For example, the field can be an unused opcode of the header of the DNS response 120. Alternatively, the information specifying that the domain name is potentially generated by malware can be included in a field in a payload of the DNS response 120.

Figure 2:
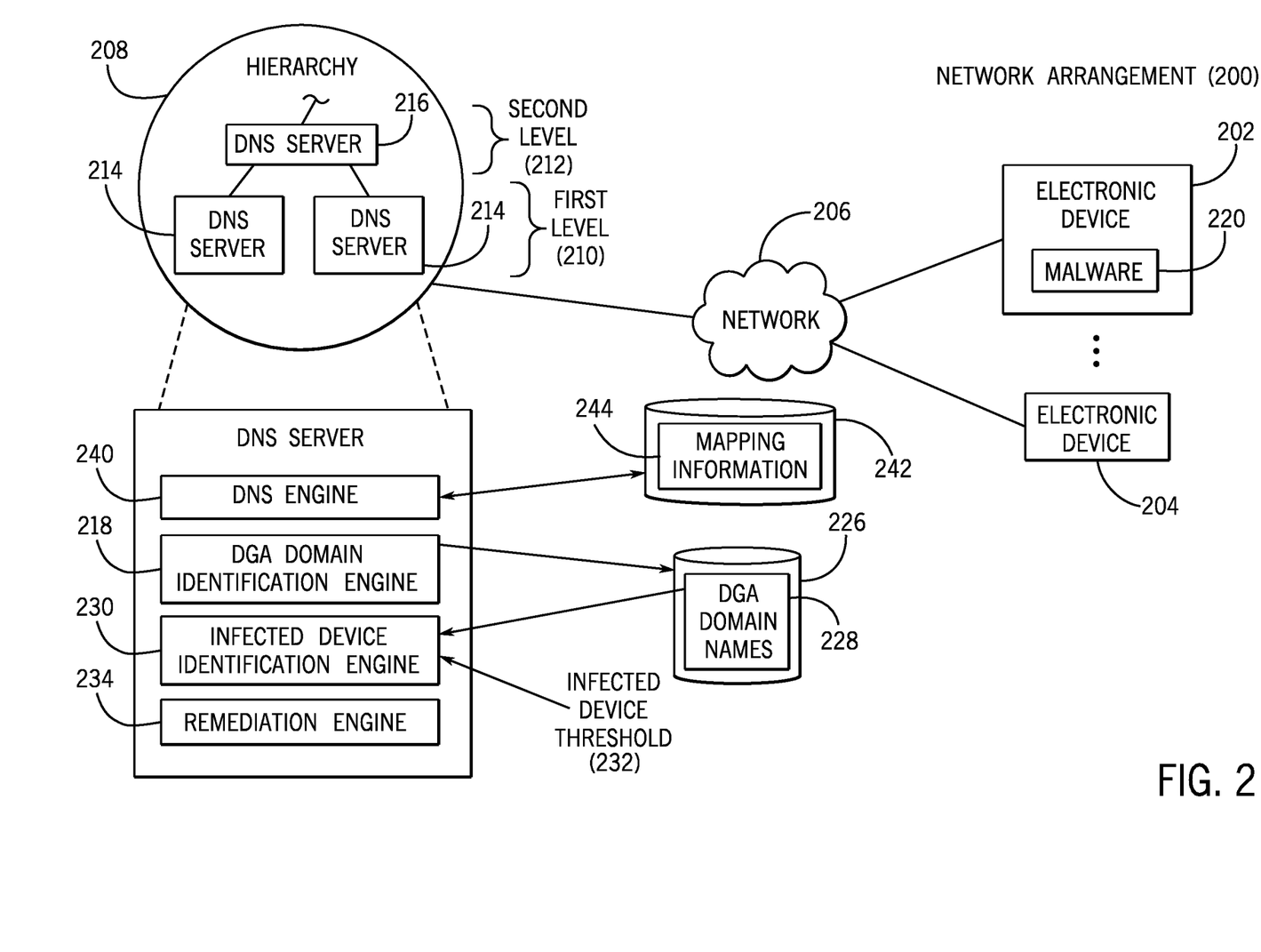
FIG. 2 is a block diagram of a network arrangement that includes a Domain Name System (DNS) server including a Domain Generation Algorithm (DGA) domain name identification engine and an infected device identification engine, according to some examples.

FIG. 2 is a block diagram of an example network arrangement 200 that includes various electronic devices 202 and 204 (examples of the device 104 of FIG. 1) that are coupled over a network 206 (which can correspond to the network 106 of FIG. 1). Although not shown, the network 206 can include switches and routers. The network arrangement 200 may be operated by an enterprise (or multiple enterprises).

Although just two electronic devices 202 and 204 are shown in FIG. 2, it is noted that in other examples, the network arrangement 200 can include a larger number of electronic devices that can communicate over the network 206.

A hierarchy 208 of DNS servers can be coupled to the network 206. A DNS server can be implemented as a hardware processing circuit, which can include any one or some combination of the following: a microprocessor, a core of a multi-core microprocessor, a microcontroller, a programmable integrated circuit, a programmable gate array, or any other hardware processing circuit. Alternatively, a DNS server can be implemented as a combination of a hardware processing circuit and machine-readable instructions (software and/or firmware) executable on the hardware processing circuit.

The hierarchy 208 of DNS servers include multiple DNS servers at different levels of the hierarchy 208. In the example of FIG. 2, the different levels of DNS servers include a first level 210 of the hierarchy 208 and a second level 212 of the hierarchy 208. The first level 210 includes DNS servers 214, and a second level 212 includes a DNS server 216. Although just two levels of DNS servers are shown as being part of the hierarchy 208, it is noted that other examples, DNS servers can be arranged in more than two levels.

Also, in different examples, each of the levels 210 and 212 can include a different number of DNS servers than shown in FIG. 2.

The DNS servers 214 at the first level 210 receive DNS queries directly from electronic devices (including 202 and 204) over the network 206. A DNS server 214 that receives a DNS query performs a lookup of the domain name included in the DNS query in mapping information stored in a cache memory of the receiving DNS server 214. If a match is identified, then the receiving DNS server 214 returns a DNS response containing a corresponding network address.

However, if a domain name lookup in the cache memory of the receiving DNS server 214 at the first level 210 results in a miss, then the receiving DNS server 214 at the first level 210 sends the DNS query to the DNS server 216 at the second level 212. The DNS server 216 at the second level 212 can perform a lookup of the domain name in mapping information accessible by the DNS server 216, and can return a DNS response based on the lookup. If there are additional levels in the hierarchy 208, any miss by the DNS server 216 at the second level 212 can result in the DNS server 216 forwarding the DNS query to a higher level of the hierarchy 208.

Although the hierarchy 208 of DNS servers is shown as being part of the network arrangement 200, it is noted that in other examples some or all of the DNS servers of the hierarchy 208 can be located outside the network arrangement 200. For example, the network 206 of the network arrangement 200 can be a local area network (LAN) or wide area network (WAN) that belongs to a specific enterprise. Devices in the network arrangement 200 are able to communicate with a public network, such as the Internet, that is outside of the network arrangement 200. A DNS server (or multiple DNS servers) can be connected to the public network, and an electronic device in the network arrangement 200 is able to issue a DNS query to the DNS server(s) that is outside of the network arrangement 200.

Alternatively, the DNS servers 214 of the first level 210 can be part of a first network, and the DNS server 216 of the second level 212 can be part of a different second network.

In the example of FIG. 2, it is assumed that the electronic device 202 has been infected with a malware code 220, while the electronic device 204 has not been infected with a malware code. In some examples, the malware code 220 can use DGA to produce pseudo-randomly generated domain names (referred to as "DGA domain names") that are submitted in corresponding DNS queries to a DNS server 214 (or to multiple DNS servers 214). In contrast, a DNS query submitted by the electronic device 204 includes a benign domain name, i.e., a domain name that is not produced by any DGA.

A DNS server (214 and/or 216) can include a DNS engine 240. As used here, an "engine" can refer to a hardware processing circuit, or alternatively, an "engine" can refer to a combination of a hardware processing circuit and machine-readable instructions executable on the hardware processing circuit.

The DNS engine 240 performs DNS functionality, which includes performing a lookup of a mapping information 244 stored in a storage medium 242 in response to a received DNS query containing a domain name (assuming the domain name is a benign domain name). If the domain name is a DGA domain name, then the DNS engine 240 can be instructed to not perform the lookup of the mapping information 244.

The mapping information 244 maps domain names to corresponding network addresses. The storage medium 242 can be implemented with a storage device or multiple storage devices. The storage medium 242 can be a cache memory in some examples. The lookup of the mapping information 244 retrieves an entry of the mapping information 244 if the mapping information 244 contains the domain name of the received DNS query.

The DNS server further includes a DGA domain identification engine 218 that analyzes the domain name of the received DNS query to determine whether the domain name is a DGA domain name or a benign domain name. To determine whether a domain name in a DNS query is a DGA domain name, the DGA domain identification engine 218 can apply any of various different techniques (discussed further below).

Any DGA domain name identified by the DGA domain identification engine 218 can be stored in a storage medium 226 (implemented with a storage device or multiple storage devices). As depicted in FIG. 2, the storage medium 226 stores DGA domain names 228 identified by the DGA domain identification engine 218.

A DNS server (214 and/or 216) can also include an infected device identification engine 230 that uses the identified DGA domain names 228 and an infected device threshold 232 for determining whether each electronic device (such as the electronic device 202 or 204) is infected with malware that produces DGA domain names.

In some examples, the infected device identification engine 230 determines whether a value based on a number of potentially malware produced DNS queries (DGA or "suspicious" DNS queries) generated within a time window by a particular device has a specified relationship (less than, greater than, equal to, or some predefined relationship) with respect to the infected device threshold 232. The value based on the number of DGA queries can equal to a count of the number of DGA queries, or can be based on a value computed based on the number of DGA queries (e.g., a fraction calculated by dividing the number of DGA queries by the total number of DNS queries). The determination of whether DNS queries occur in a time window can be based on timestamps associated with the DNS queries, and the determination of whether DNS queries are transmitted by a particular device can be based on network addresses associated with the DNS queries.

The infected device identification engine 230 identifies the particular device as potentially infected with malware based on determining that the value based on the number of suspicious DNS queries (potentially malware generated DNS queries) produced within the time window by the device having the specified relationship with respect to the infected device threshold 232.

Information pertaining to a malware-infected electronic device, as identified by the infected device identification engine 230, can be provided to a remediation engine 234, which can also be part of the DNS server or can be separate from the DNS server. Information relating to a malware-infected electronic device can include any or some combination of the following: a network address of the electronic device, a name of the electronic device, a location of the electronic device, an owner of the electronic device, information pertaining to the malware that has infected the electronic device, and so forth.

The remediation engine 234 can take remediation action to address the malware-infected electronic device. Remediation actions that can be performed by the remediation engine 234 can include any or some combination of the following: blocking the malware-infected electronic device from accessing the network 206, disabling the malware-infected electronic device (such as by shutting it down), performing a malware cleaning process on the malware-infected electronic device to quarantine or remove the malware, blocking processing of a subsequent DNS query that contains a DGA domain previously identified, sending an alert to an administrator or other user, and so forth.

In other examples, the remediation engine 234 can be omitted, with the infected device identification engine 230 sending an alert to an administrator or other user regarding an identified malware-infected electronic device.

In some examples, the engines 218, 230, and 234 can be plug-in modules of the DNS server. A plug-in module refers to a routine (including machine-readable instructions) that can be added to machine-readable instructions already present in the DNS server to add further features, include a feature for performing DGA domain identification, a feature to perform infected device identification, and a feature to perform remediation to address an infected device.

Example DGA Domain Identification Techniques

Examples of techniques for identifying DGA domains by the DGA domain identification engine 218 include an n-gram based technique, a digit counting based technique, or any other technique. The following describes the n-gram based technique and the digit counting based technique in further detail. It is noted that in other examples, other types of DGA domain identification techniques can be used.

N-Gram Based Technique

The n-gram based technique identifies, in a domain name, n-grams that do not appear in words of a given language (such as English or a different language), where n≥1, and each n-gram includes a sequence of n letters. The system compares a value derived from a number of the identified n-grams to a DGA domain threshold, and indicates that the domain name is potentially generated by malware in response to the value having a specified relationship (less than, or greater than, equal to, or some predefined relationship) with respect to the DGA domain threshold.

To determine whether a domain name in a received DNS query is a DGA domain name, the DGA domain identification engine 218 can also consult a whitelist of (known) benign domain names, and an n-gram repository. The whitelist of benign domain names can refer to any data collection of domain names identified as benign. The benign domain names included in the whitelist are domain names that have been identified to not be DGA generated, based on historical data or based on expertise or knowledge of an entity, including a human, a machine, or a program. Any domain name that is included in the whitelist of benign domain names would not be considered further by the DGA domain identification engine 218.

The n-gram repository includes a data structure (e.g., a database, a list, or any other data collection) of n-grams that have been identified as n-grams that do not appear in words of a given language, such as the English language or some other language. The n-grams stored in the n-gram repository include n-grams.

The n-grams in the n-gram repository can be referred to as "forbidden" n-grams. An n-gram is a sequence of n letters where a letter can include an alphabet character, a number, a symbol, or any other type of character. For example, in the domain name "bqwqeiswupyny.org," forbidden trigrams (n-grams with n=3) are: bqw, qei, swu, pyn, yny, qwq, etc.

Any n-gram in a domain name that matches an n-gram in the n-gram repository can be identified as a forbidden n-gram.

The DGA domain identification engine 218 can count a number of n-grams in a domain name. The DGA domain identification engine 218 can use a DGA domain threshold for determining whether a value derived based on the number of n-grams in the domain name is indicative of the domain name being a DGA domain name.

The value derived based on the number of the forbidden n-grams can be one of the following: (1) the number of the forbidden n-grams in the domain name, or (2) a value that is computed by applying a function or expression to the number of the forbidden n-grams. In some examples, a value based on the number of the forbidden n-grams is a fraction computed based on dividing the number of forbidden n-grams by the total number of n-grams in the domain name. In other examples, other values can be computed based on the number of forbidden n-grams.

In response to the value (based on the number of forbidden n-grams) having a specified relationship (e.g., greater than, less than, equal to, etc.) with respect to the DGA domain threshold, the DGA domain identification engine 218 identifies the domain name as being a DGA domain name, and associates information with the received DNS query, where the information that is associated can include a timestamp of the DNS query, a network address from which the DNS query was sent, and a domain name in the DNS query. The timestamp of the DNS query can be the time at which the DNS query was transmitted by an electronic device or received by a receiving device, such as the DGA domain identification engine 218. In further examples, additional or different information can be associated with the received DNS query, including a length of the DNS query, the value derived based on the number of n-grams in the domain name, or other information.

Digit Counting Based Technique

The digit counting based technique counts a number of digits in a domain name of a received DNS query, where each digit is a number, a symbol, or a character that is not in a language of the domain name (non-first language character). The digit counting based technique compares a value based on the number of digits to a DGA domain threshold, and indicates that the domain name is potentially generated by malware in response to the value having a specified relationship (less than, or greater than, equal to, or some predefined relationship) with respect to the DGA domain threshold.

To determine whether a domain name in the received DNS query is a DGA domain name, the DGA domain identification engine 218 can first consult a whitelist of (known) benign domain names as explained above. Any domain name that is included in the whitelist of benign domain names would not be considered further by the digit counting based technique.

According to the digit counting based technique, the DGA domain identification engine 218 can count a number of digits in the domain name, where each digit is a number, a symbol, or a character that is not in a language of the domain name. For example, in the domain name "15xy299e*555h.com," the number of digits is 9 (1, 5, 2, 9, 9, *, 5, 5, 5). As another example, in the domain name "x7z4ΔλŃ2abc.org," the number of digits is 6 (7, 4, Δ, λ, Ń, 2). In the latter example, it is assumed that the domain name is in the English language, and thus the digits A, A, and N (in addition to the numbers) are not considered to be English language characters.

The DGA domain identification engine 218 compares a value based on the number of digits to the DGA domain threshold. The value derived based on the number of the digits can be one of the following: (1) the number of the digits in the domain name, or (2) a value that is computed by applying a function or expression to the number of the digits. In some examples, a value based on the number of the digits is a fraction computed based on dividing the number of digits by the total number of characters (including digits and non-digits) in the domain name. In other examples, other values can be computed based on the number of digits.

In response to the value (based on the number of digits) having a specified relationship (e.g., greater than, less than, equal to, etc.) with respect to the DGA domain threshold, the DGA domain identification engine 218 identifies the domain name as a DGA domain name, and associates information with the received DNS query as explained further above.

Infected Device Identification

As noted above, the infected device identification engine 230 uses identified DGA domain names (e.g., 228 in FIG. 2) and the infected device threshold 232 for determining whether a device is infected with malware that produces DGA domain names.

In some examples, the infected device identification engine 230 uses a dissimilarity based technique that determines, for a device that transmitted domain names, a dissimilarity between the domain names, compares a value derived from the determined dissimilarity to a DGA domain threshold, and identifies the device as malware infected in response to the comparing.

In other examples, other techniques for determining whether a device is infected with malware based on identified DGA domain names can be used.

According to the dissimilarity based technique, the infected device identification engine 230 determines dissimilarities between respective pairs of the domain names transmitted in respective DNS queries by a particular device within a specified time window. The specified time window has a predefined or configurable time duration.

The determination of the dissimilarities includes determining a first dissimilarity between a first pair of domain names transmitted by the particular device within the specified time window, determining a second dissimilarity between a second pair of domain names transmitted by the particular device within the specified time window, and so forth.

A dissimilarity between domain names of a pair of domain names can be represented by a dissimilarity metric. The dissimilarity metric can include an edit distance between the domain names, such as a Levenshtein edit distance. An edit distance refers to a number of edit operations to transform a first string to a second string. The edit operations include an insertion of a character in a string, a deletion of a character from a string, and a substitution of a character in a string. As an example, it takes three edit operations to transform "kitten" into "sitting." The three operations include: (1) substituting the first "k" in "kitten" with an "s" to produce "sitten"; (2) substituting the "e" in "sitten" to produce "sittin"; and (3) adding a "g" to the end of "sittin" to produce "sitting."

In other examples, other dissimilarity metrics can be used to represent dissimilarities between domain names.

Moreover, although reference is made to determining a dissimilarity between domain names in each pair of multiple pairs of domain names, techniques or mechanisms according to some implementations of the present disclosure can more generally be applied to examples where a dissimilarity is determined between domain names (two or more) within each group of multiple groups of domain names, where each group of domain names includes two or more domain names.

The infected device identification engine 230 aggregates the determined dissimilarities of the respective pairs of domain names transmitted by the particular device within the specified time window. The aggregating of the determined dissimilarities derives an aggregate value that provides an overall measure of dissimilarity among the domain names transmitted by the particular device within the specified time window. The aggregating can aggregate the dissimilarity metrics, such as by computing an average, a mean, a median, a sum, or any other combined value. For example, the aggregating of edit distances can produce an average edit distance.

In some examples, prior to performing the aggregating of the dissimilarity metrics, the infected device identification engine 230 normalizes dissimilarity metrics with respect to lengths of domain names, to reduce or prevent a bias towards longer domain names. For example, for longer domain names, a larger number of edit operations are performed to change from a first domain name to a second domain name. Normalizing a dissimilarity metric with respect to lengths of domain names can involve dividing the dissimilarity metric by the length of a domain name (or the average length of the multiple domain names in a pair or other group of domain names). The aggregating of dissimilarity metrics can then be an aggregate of the normalized dissimilarity metrics to derive the aggregate value.

The infected device identification engine 230 compares the aggregate value derived by aggregating the (normalized) dissimilarity metrics to an infected device threshold 232 for determining whether the electronic device is infected with malware that produces DGA domain names.

In response to determining that the aggregate value exceeds the infected device threshold 232, the infected device identification engine 230 identifies the electronic device as malware infected. The identifying of the electronic device as malware-infected can include identifying a network address (e.g., an IP address) of the electronic device as malware-infected.

In response to determining that the aggregate value does not exceed the threshold, the infected device identification engine 230 does not identify the electronic device as malware-infected.

Scalable DGA Domain/Infected Device Identification

An issue associated with implementing DGA domain identification, infected device identification, and/or infected device remediation in a DNS server is an issue of scale. A DNS server is an important part of an enterprise's networking infrastructure, and often processes a large number of DNS queries originating from various devices. Adding other functionalities to a DNS server which is already performing quite a bit of work can overload the DNS server.

To address the foregoing issue, the DGA domain identification engine 218, the infected device identification engine 230, and/or the remediation engine 234 can be implemented in a selected level of the hierarchy 208 of DNS servers to avoid overloading any DNS server. As explained in connection with FIG. 2, when an electronic device submits a DNS query, the DNS query first goes to DNS servers (214) at the first level 210 of the hierarchy 208.

If a DNS server 214 at the first level 210 has the domain name in its cache memory, then the DNS server 214 responds with the corresponding network address. In case of a cache miss (i.e., the domain name is not in the cache memory), the DNS query is forwarded to the DNS server 216 at the second level 212 of the hierarchy 208. The DNS server 216 then checks its own cache memory for the domain name. In case of a cache miss, the DNS query is then forwarded to a DNS query at a higher level (not shown) of the hierarchy 208.

The number of DNS queries processed by a higher level (second level or higher) DNS server is orders of magnitude less than the first level DNS servers 214. Also, DNS queries that reach a higher level DNS server usually contain domain names that are "new," i.e., the domain names have not been previously seen. DGA domain names are more likely to be in such new domain names. DNS queries containing DGA domain names will go to higher level DNS servers since the DGA domain names will not be present in the cache memories of lower level DNS servers. As a result, DGA domain name detection will not be compromised by placing the detection engines at high level DNS servers.

Since a higher level DNS server is likely processing a smaller number of DNS queries than a first level DNS server, deploying the DGA domain identification engine 218, the infected device identification engine 230, and/or the remediation engine 234 at a higher level DNS server is less likely to overburden the higher level DNS server.

In other examples, for applications in a security-critical environment, the DGA domain identification engine 218, the infected device identification engine 230, and/or the remediation engine 234 can be deployed in a first level DNS server 214. The first level DNS server 214 likely receives DNS queries from a smaller number of devices than a higher level DNS server. As a result, the first level DNS server is more likely to know what resource to contact (e.g., an administrator or a computing resource) to address an infected device. A shortcoming of placing the engines at higher level DNS servers is that a higher level DNS server does not know the electronic device that made a DNS query. The higher level DNS server sees DNS queries coming from lower level DNS servers. So the DGA domain identification engine 218 in a higher level DNS server can detect a domain to be DGA and return an NXDOMAIN response, but the higher level DNS server will not know which electronic device made the DNS query (and hence is infected).

Placing the engines in a lower level DNS server can help in identifying electronic devices making DNS queries and thus allow for the identification of infected electronic devices.

In alternative examples where DNS servers are not arranged in a hierarchy (e.g., 208 in FIG. 2), the DGA domain identification engine 218, the infected device identification engine 230, and/or the remediation engine 234 can be deployed on a more lightly loaded DNS server, or the tasks of such engines can be distributed across multiple DNS servers for load balancing.

Example Implementations

Figure 3:
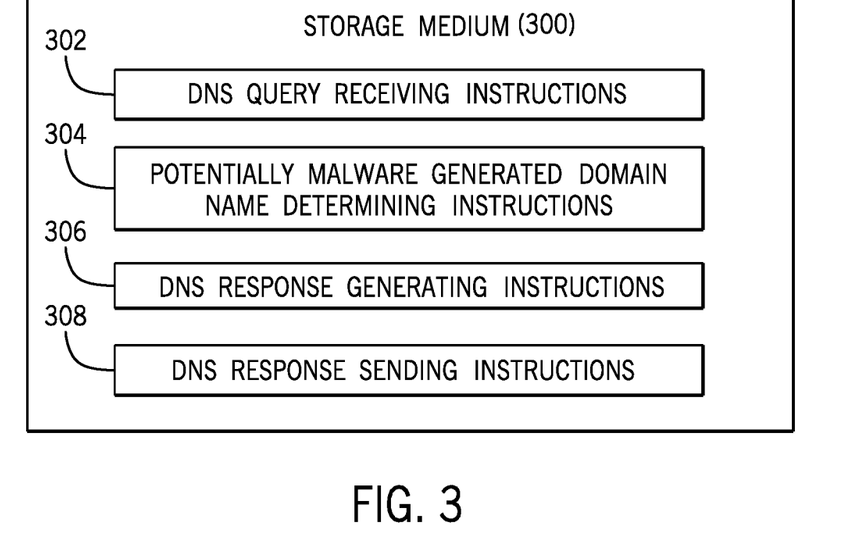
FIG. 3 is a block diagram of a storage medium storing machine-readable instructions according to further examples.

FIG. 3 is a block diagram of a non-transitory machine-readable or computer-readable storage medium 300 storing machine-readable instructions that upon execution cause a DNS server to perform various tasks.

The machine-readable instructions include DNS query receiving instructions 302 to receive, over a network, a DNS query containing a domain name, the DNS query sent by a device. The machine-readable instructions further include potentially malware generated domain name determining instructions 304 to determine whether the domain name is potentially generated by malware. In response to determining that the domain name is potentially generated by malware, the machine-readable instructions include DNS response generating instructions 306 to generate a DNS response containing information indicating that the domain name is potentially generated by malware, and DNS response sending instructions 308 to send the DNS response to the network.

Figure 4:
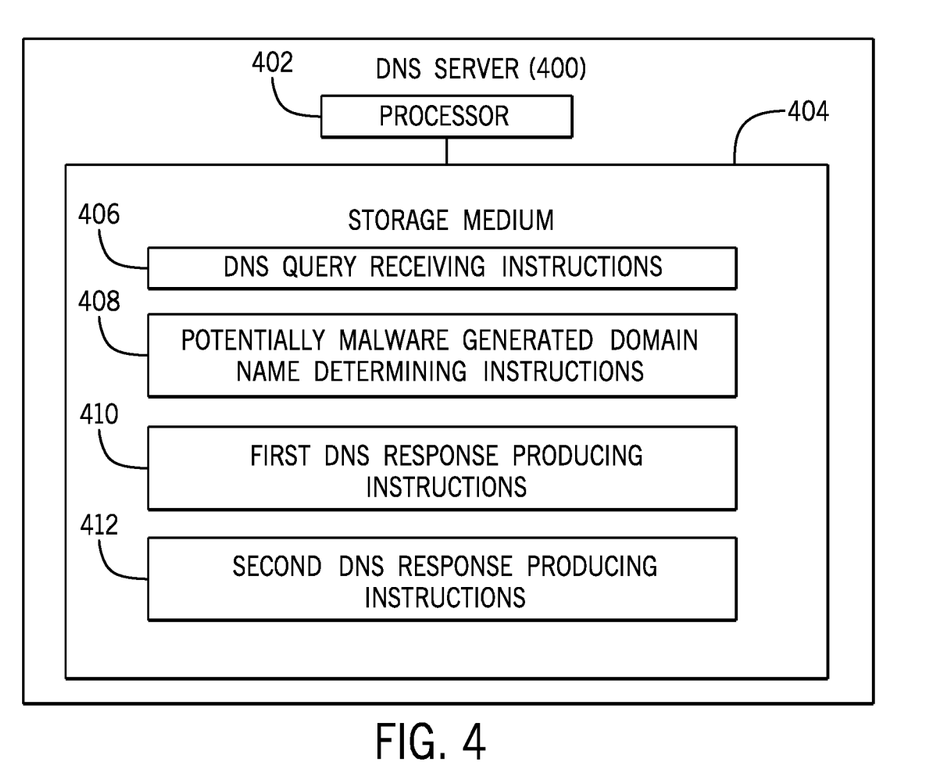
FIG. 4 is a block diagram of a DNS server according to other examples.

FIG. 4 is a block diagram of a DNS server 400 according to further examples. The DNS server 400 can be an example of a DNS server in FIG. 1 or 2.

The DNS server 400 includes a processor 402 (or multiple processors), and a non-transitory storage medium 404 storing machine-readable instructions executable on the processor to perform various tasks. Machine-readable instructions executable on a processor can refer to the instructions executable on a single processor or the instructions executable on multiple processors. A processor can include a microprocessor, a core of a multi-core microprocessor, a microcontroller, a programmable integrated circuit, a programmable gate array, or another hardware processing circuit.

The machine-readable instructions in the storage medium 404 include DNS query receiving instructions 406 to receive, over a network, a DNS query containing a domain name, the DNS query sent by a device. The machine-readable instructions further include potentially malware generated domain name determining instructions 408 to determine whether the domain name is potentially generated by malware.

The machine-readable instructions additionally include first DNS response producing instructions 410 to, in response to determining that the domain name is not potentially generated by malware, include, in a DNS response, a network address corresponding to the domain name. The machine-readable instructions further include second DNS response producing instructions 412 to, in response to determining that the domain name is potentially generated by malware, include, in a DNS response, information indicating that the domain name is potentially generated by malware.

Figure 5:
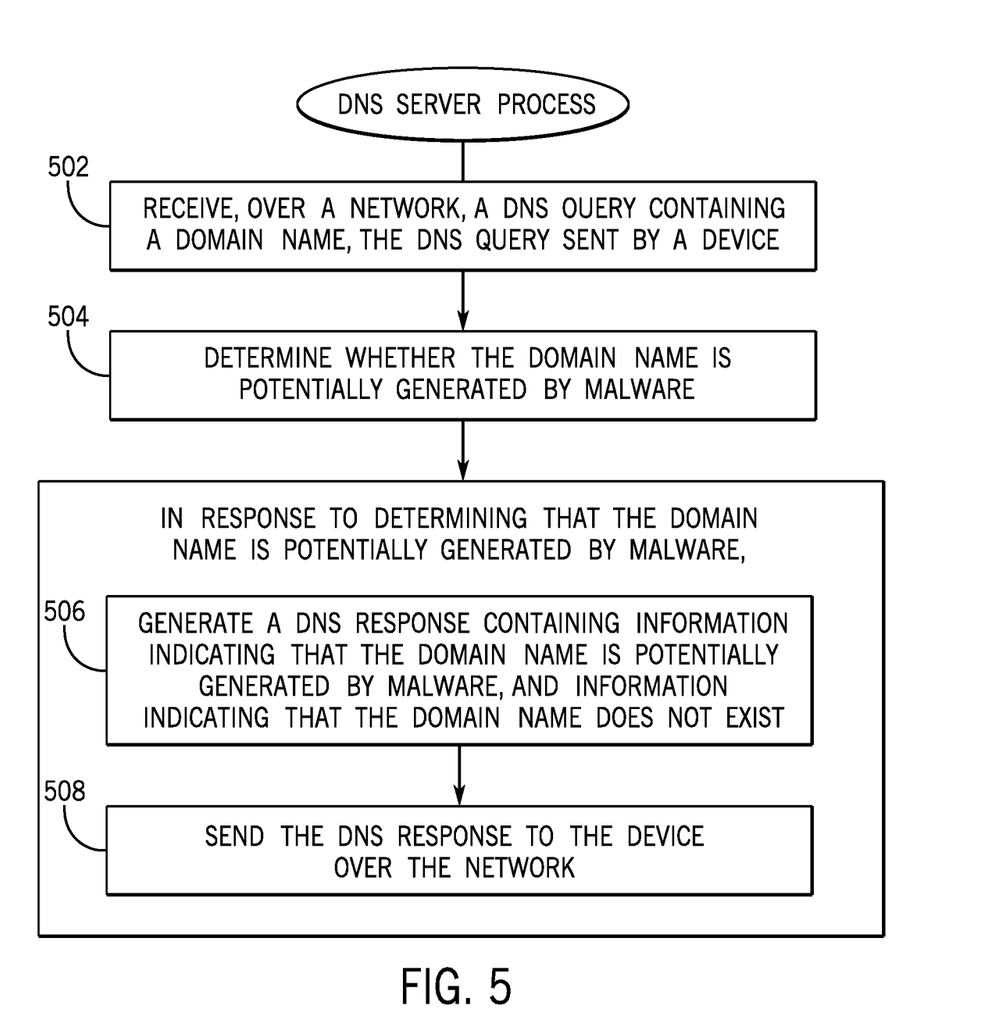
FIG. 5 is a flow diagram of a process according to additional examples.

FIG. 5 is a flow diagram of a DNS server according to further examples. The DNS server receives (at 502), over a network, a DNS query containing a domain name, the DNS query sent by a device. The DNS server determines (at 504) whether the domain name is potentially generated by malware.

In response to determining that the domain name is potentially generated by malware, the DNS server generates (at 506) a DNS response containing information indicating that the domain name is potentially generated by malware, and information indicating that the domain name does not exist, and sends (at 508) the DNS response to the device over the network.

The storage medium 300 (FIG. 3) or 404 (FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a Domain Name System (DNS) server to:
receive, over a network, a first DNS query containing a first domain name, the first DNS query sent by a first device;
determine whether the first domain name is potentially generated by malware;
in response to determining that the first domain name is potentially generated by malware:
generate a first DNS response containing information indicating that the first domain name is potentially generated by malware, the first DNS response being responsive to the first DNS query, and
send the first DNS response to the network;
receive, over the network, a second DNS query containing a second domain name, the second DNS query sent by a second device;
determine whether the second domain name is potentially generated by malware; and
in response to determining that the second domain name is not potentially generated by malware:
access mapping information to retrieve a network address corresponding to the second domain name, and
send a second DNS response containing the network address over the network to the second device.

2. The non-transitory machine-readable storage medium of claim 1, wherein the DNS server is part of a hierarchy of DNS servers.

3. The non-transitory machine-readable storage medium of claim 2, wherein the DNS server is at a first level of the hierarchy of DNS servers, the DNS server at the first level of the hierarchy of DNS servers to directly receive the first DNS query sent by the first device.

4. The non-transitory machine-readable storage medium of claim 2, wherein the DNS server is in a level of the hierarchy of DNS servers higher than a first level of the hierarchy of DNS servers, and wherein the first DNS query is received by the DNS server from another DNS server in the first level of the hierarchy of DNS servers.

5. The non-transitory machine-readable storage medium of claim 1, wherein the information indicating that the first domain name is potentially generated by malware is included in a field of a header of the first DNS response.

6. The non-transitory machine-readable storage medium of claim 1, wherein the first DNS response is without a network address corresponding to the first domain name.

7. The non-transitory machine-readable storage medium of claim 6, wherein the first DNS response further contains an indication that the first domain name does not exist.

8. The non-transitory machine-readable storage medium of claim 1, wherein the instructions upon execution cause the DNS server to:
identify a first subset of domain names that are potentially generated by malware;
identify a second subset of domain names that are not potentially generated by malware;
determine whether a value based on a number of DNS queries containing the domain names in the first subset and generated by the first device within a time window has a specified relationship with a threshold; and
identify the first device as a malware-infected device in response to the value having the specified relationship with the threshold.

9. The non-transitory machine-readable storage medium of claim 8, wherein the instructions upon execution cause the DNS server to:
perform a remediation action with respect to the malware-infected device.

10. The non-transitory machine-readable storage medium of claim 9, wherein the remediation action is selected from among: blocking the malware-infected device from accessing the network, disabling the malware-infected device, performing a malware cleaning process on the malware-infected device, and blocking processing of a subsequent DNS query from the malware-infected device.

11. A Domain Name System (DNS) server comprising:
a processor; and
a non-transitory storage medium storing instructions executable on the processor to:
receive, over a network, a DNS query containing a domain name, the DNS query sent by a device;
determine whether the domain name is potentially generated by malware;
in response to determining that the domain name is not potentially generated by malware, include, in a first DNS response, a network address corresponding to the domain name; and
in response to determining that the domain name is potentially generated by malware, include, in a second DNS response, information indicating that the domain name is potentially generated by malware, wherein the DNS server is part of a higher level of a hierarchy of DNS servers, the higher level higher than a first level of the hierarchy of DNS servers, the first level including a DNS server to directly receive the DNS query from the device over the network, and the DNS server in the higher level to receive the DNS query from the DNS server in the first level responsive to the DNS server in the first level determining that the domain name is not within a cache of the DNS server in the first level.

12. The DNS server of claim 11, wherein the second DNS response including the information indicating that the domain name is potentially generated by malware does not include the network address corresponding to the domain name.

13. The DNS server of claim 11, wherein the instructions are executable on the processor to:
in response to determining that the domain name is not potentially generated by malware, access mapping information to retrieve the network address corresponding to the domain name, the mapping information mapping domain names to respective network addresses.

14. The DNS server of claim 11, wherein the instructions are executable on the processor to:
identify a first subset of domain names that are potentially generated by malware;

identify a second subset of domain names that are not potentially generated by malware;

determine whether a value based on a number of DNS queries containing the domain names in the first subset and generated by the device within a time window has a specified relationship with a threshold;

identify the device as a malware-infected device in response to the value having the specified relationship with the threshold; and perform a remediation action with respect to the malware-infected device.

15. A method comprising:

receiving, by a Domain Name System (DNS) server comprising a processor, over a network, DNS queries containing domain names, the DNS queries sent by a device;

determining, by the DNS server, a first subset of the domain names that are potentially generated by malware;

determining, by the DNS server, a second subset of the domain names that are not potentially generated by malware;

for a first domain name in the first subset of the domain names:
  generating, by the DNS server, a DNS response containing information indicating that the first domain name is potentially generated by malware, and information indicating that the first domain name does not exist, and
  sending, by the DNS server, the DNS response to the device over the network;

determining, by the DNS server, whether a value based on a number of DNS queries containing domain names in the first subset of the domain names and generated by the device within a time window has a specified relationship with a threshold;

identifying, by the DNS server, the device as a malware-infected device in response to the value having the specified relationship with the threshold; and performing, by the DNS server, a remediation action with respect to the malware-infected device.

16. The method of claim 15, further comprising:

performing a remediation action against a subsequent DNS query that contains the first domain name.

* * * * *